(12) United States Patent
Park et al.

(10) Patent No.: US 10,727,548 B2
(45) Date of Patent: Jul. 28, 2020

(54) ENERGY STORAGE SYSTEM

(71) Applicant: SAMSUNG SDI CO., LTD., Yongin-si, Gyeonggi-do (KR)

(72) Inventors: Jin-Woo Park, Yongin-si (KR); Yong-Suk Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 961 days.

(21) Appl. No.: 14/849,420

(22) Filed: Sep. 9, 2015

(65) Prior Publication Data
US 2016/0099489 A1   Apr. 7, 2016

(30) Foreign Application Priority Data

Oct. 7, 2014 (KR) .................. 10-2014-0135107

(51) Int. Cl.
*H01M 10/613* (2014.01)
*H01M 10/6566* (2014.01)
*H01M 10/6563* (2014.01)
*H01M 2/10* (2006.01)
*H01M 10/627* (2014.01)
*H01M 10/625* (2014.01)

(52) U.S. Cl.
CPC ....... *H01M 10/613* (2015.04); *H01M 2/1077* (2013.01); *H01M 10/627* (2015.04); *H01M 10/6563* (2015.04); *H01M 10/6566* (2015.04); *H01M 10/625* (2015.04); *H01M 2220/10* (2013.01); *H01M 2220/20* (2013.01)

(58) Field of Classification Search
CPC ............. H01M 10/613; H01M 10/627; H01M 10/6563; H01M 10/6566; H01M 10/625; H01M 2/1077; H01M 10/6551; H01M 10/652; H01M 10/6556; H01M 2220/10; H01M 2220/20
USPC ........................................................ 429/120
See application file for complete search history.

(56) References Cited

U.S. PATENT DOCUMENTS

| | | | | |
|---|---|---|---|---|
| 2006/0172187 A1* | 8/2006 | Ambrosio | ........... | H01M 2/1077 429/120 |
| 2007/0202792 A1* | 8/2007 | Shimizu | ............. | H01M 2/1077 454/69 |
| 2011/0262791 A1* | 10/2011 | Im | ........................ | H01M 2/1077 429/120 |
| 2013/0183564 A1* | 7/2013 | Wagner | ............... | H01M 2/1077 429/120 |

(Continued)

FOREIGN PATENT DOCUMENTS

| KR | 1994-0009603 A | 5/1994 |
|---|---|---|
| KR | 10-2012-0120663 A | 11/2012 |

(Continued)

*Primary Examiner* — Lingwen R Zeng
(74) *Attorney, Agent, or Firm* — Lewis Roca Rothgerber Christie LLP

(57) ABSTRACT

An energy storage device for uniformly controlling internal temperature of a container by controlling a flow of a cooling air current includes: racks for accommodating a plurality of battery packs; a container for accommodating the racks; an access floor provided at a lower part of the container for supplying a cooling air current to the racks through supply openings; and a distribution plate provided under the access floor to distribute an amount of the cooling air current that is supplied from under the access floor.

11 Claims, 7 Drawing Sheets

(56) References Cited

U.S. PATENT DOCUMENTS

2013/0241493 A1* 9/2013 Kosaki .................... B60K 1/04
320/128
2013/0323551 A1* 12/2013 Lee .................... H01M 2/1077
429/83

FOREIGN PATENT DOCUMENTS

KR      20120120663 A  * 11/2012
KR   10-2013-0036396 A    4/2013

* cited by examiner

ENERGY STORAGE SYSTEM

CROSS-REFERENCE TO RELATED APPLICATION

This application claims priority to and the benefit of Korean Patent Application No. 10-2014-0135107 filed in the Korean Intellectual Property Office on Oct. 7, 2014, the entire content of which is incorporated herein by reference.

BACKGROUND

1. Field

The present invention relates to an energy storage device (system).

2. Description of the Related Art

To solve waste due to power oversupply and overload due to a power supply shortage as well as to effectively overcome a mismatch between power production and consumption, a smart grid system has been researched to flexibly control the amount of power supply in connection with various information and communication technologies.

That is, the smart grid system includes an energy storage system that stores power when the power consumption is low and supplies the stored power along with produced power to consumers when the power consumption is high.

In order to store the produced power, the energy storage system includes battery packs that include rechargeable batteries.

The energy storage system can be used not only in the smart grid system but also in an electric vehicle charging station for supplying the charged power to electric vehicles.

As an example, the energy storage system may be configured by installing a plurality of battery packs in a rack and then placing a plurality of racks in a container.

Each battery pack is formed by collecting and electrically connecting a plurality of rechargeable batteries in various suitable structures.

Each rechargeable battery generates heat since it repeatedly performs charging and discharging operations due to its internal electrochemical reaction.

Accordingly, as rechargeable batteries having high capacity are developed and their corresponding battery packs are highly concentrated, a corresponding energy storage system generates an excessively large amount of heat due to the charging and discharging operations of the rechargeable batteries.

Such heat generation may cause internal damage to the rechargeable batteries, thereby degrading the performance and lifespan of the rechargeable batteries.

In order to prevent this, an air conditioning system is used to cool the rechargeable batteries and the battery packs.

As an example, in an up-flow system, a cooling air current is changed to a warm air current after cooling the battery pack, and the warm air current and a newly supplied cooling air current are mixed in the middle by convection.

Thus, a cooling effect for the battery pack is reduced.

That is, large temperature deviations (or variations) occur between a region to which the cooling air current is directly supplied and regions to which the warm air current is supplied or the mixed air current is supplied.

In such up-flow and down-flow systems, the temperature deviations (or variations) increase at an overall region inside the container and between the battery packs in one rack.

The above information disclosed in this Background section is only for enhancement of understanding of the background of the invention and therefore it may contain information that does not form the prior art that is already known to a person of ordinary skill in the art.

SUMMARY

Aspects of one or more embodiments of the present invention are directed toward an energy storage device (system) that is formed by installing a plurality of racks in an access floor inside a container and then installing a plurality of battery packs in each rack. Aspects of one or more embodiments of the present invention are directed toward an energy storage device (system) that is capable of uniformly controlling internal temperature of a container by controlling a flow of a cooling air current.

Aspects of one or more embodiments of the present invention are directed toward an energy storage device that is capable of minimizing or reducing temperature deviations (or variations) between racks and between battery packs accommodated in the racks.

An energy storage device according to an exemplary embodiment of the present invention includes: racks for accommodating a plurality of battery packs; a container for accommodating the racks; an access floor at a lower part of the container for supplying a cooling air current to the racks through supply openings; and a distribution plate under the access floor to distribute an amount of the cooling air current that is supplied from under the access floor.

The supply openings may be perforations in a perforated plate, and the perforated plate may be installed in the access floor.

A plurality of distribution plates may be formed to create a plurality of air passageways for distributing the cooling air current and the distribution plates may be extended in parallel with a flow direction of the cooling air current and spaced apart from each other in a direction crossing the flow direction.

The distribution plates may include: a first plate at a center part in a width direction of the access floor; a second plate located outwardly relative to the first plate; and one or more third plates between the first and second plates, wherein the one or more third plates nearer to the second plate are longer than those nearer to the first plate.

The access floor may include an upper plate and a pair of side plates at opposite lateral sides of the upper plate for supplying the cooling air current, and the supply openings may be in the upper plate and the side plates.

The distribution plates may include: a first plate at a center part in a width direction of the upper plate; a second plate located outwardly relative to the first plate; and one or more third plates between the first and second plates, wherein the one or more third plates nearer to the second plate are longer than those nearer to the first plate.

Harness bundles connected to the battery packs may be separately arranged in the air passageways according to the lengths of the distribution plates.

The energy storage device according to the exemplary embodiment of the present invention may further include: an air blower at one side of the access floor to supply the cooling air current through the supply openings; and a ventilator at an upper part of the container to discharge a warm air current that is heated by cooling the battery packs accommodated in the racks.

The supply openings may have a smaller opening area (e.g., amount of opening) closer to the ventilator, and may have a larger opening area further away from the ventilator.

A plurality of distribution plates including the distribution plate may extend in a direction crossing a flow direction of the cooling air current, spaced apart from each other along the flow direction, and attached to a bottom surface of the access floor, thereby controlling the cooling air current that is supplied to the supply holes.

The distribution plates may protrude least at a supply side of the cooling air current, and may protrude longer further away from the supply side of the cooling air current.

The racks may be installed on the access floor, a plurality of supporters may be interposed between the racks and the access floor, and the supporters may have transmission passages that are connected to some of the supply openings to supply the cooling air current to the battery packs.

According to the exemplary embodiment of the present invention described above, the distribution plates can be positioned under the access floor to control the flow of the cooling air current that is supplied to the racks and the battery packs.

Accordingly, the internal temperature of the container can be uniformly or substantially uniformly controlled.

In addition, the temperature deviations (or variations) between the racks and between battery packs accommodated in the racks can be reduced or minimized.

DETAILED DESCRIPTION

Figure 1:
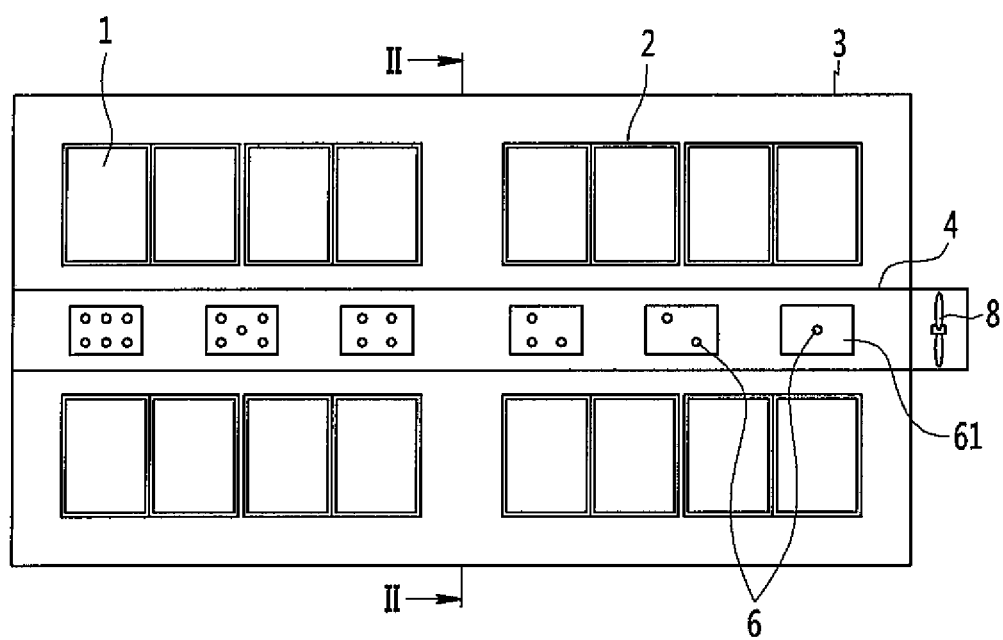
FIG. 1 is a top plan view of an energy storage device according to a first exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. As used herein, the terms "use," "using," and "used" may be considered synonymous with the terms "utilize," "utilizing," and "utilized," respectively. Further, the use of "may" when describing embodiments of the inventive concept refers to "one or more embodiments of the present invention". Also, the term "exemplary" is intended to refer to an example or illustration. It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

The drawings and description are to be regarded as illustrative in nature and not restrictive, and like reference numerals designate like elements throughout the specification.

Figure 2:
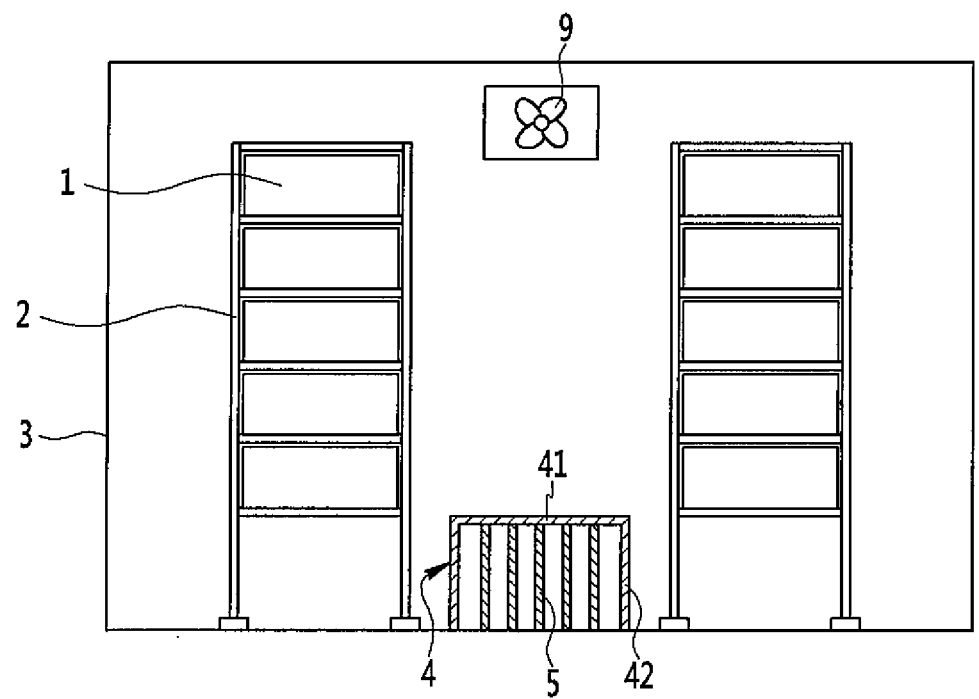
FIG. 2 is a cross-sectional view of FIG. 1 taken along the line II-II.

FIG. 1 is a top plan view of an energy storage device or "energy storage system" according to a first exemplary embodiment of the present invention, and FIG. 2 is a cross-sectional view of FIG. 1 taken along the line II-II.

Referring to FIGS. 1 and 2, the energy storage device of the first exemplary embodiment includes a rack 2 for accommodating a plurality of battery packs 1, a container 3 for accommodating one or more racks 2, an access floor 4 provided at a lower part of the container 3 inside thereof, and distribution plates 5 provided under the access floor 4.

Each battery pack 1 may be formed by connecting a plurality of rechargeable batteries in series, in parallel, or a combination thereof such that it can have various structures.

Accommodated in a plurality of storage spaces that are provided in the rack 2, the battery packs 1 are electrically coupled to each other.

A plurality of racks 2 may be provided in the container 3, and the battery packs 1 provided in the plurality of racks 2 are electrically coupled to charge and discharge a current through a final terminal (not shown) that is provided in the container 3.

The container 3 forms an overall exterior shape of the energy storage device by accommodating one rack or the plurality of racks 2, thereby making movement and handling of the energy storage device easier.

The access floor 4 is provided with supply holes 6 that are provided at the lower part of the container 3 therein to supply a cooling air current, and allows the cooling air current to be supplied to the racks 2 and the battery packs 1.

Depending on structures of the access floor 4, an interior of the container 3 may be variously divided.

In the first exemplary embodiment, the container 3 may be divided into a lower part (or an interior) under the access floor 4 and an upper part (or an exterior) thereabove.

That is, the cooling air current is supplied to the inside of the access floor 4, and the racks 2 are disposed outside of the access floor 4.

Provided under the access floor 4 (or interior), the distribution plates 5 are configured to distribute an amount of cooling air current that is supplied to above the access floor 4 (or inside thereof) from under the access floor 4 (or outside thereof), to uniformly supply the amount of air toward the racks 2, and to reduce temperature deviations (or variations) between the racks 2.

Further, the distribution plates 5 are configured to reduce the temperature deviations (or variations) between the battery packs 1 of each rack 2.

As an example, the supply holes (or supply openings) 6 may be formed in a perforated plate 61 in which the holes are perforated.

The perforated plates 61 may be installed in installation holes 43 of the access floor 4 near the racks 2 to control the amount of cooling air current (or air volume) that is supplied to the racks 2 and the battery packs 1.

Figure 3:
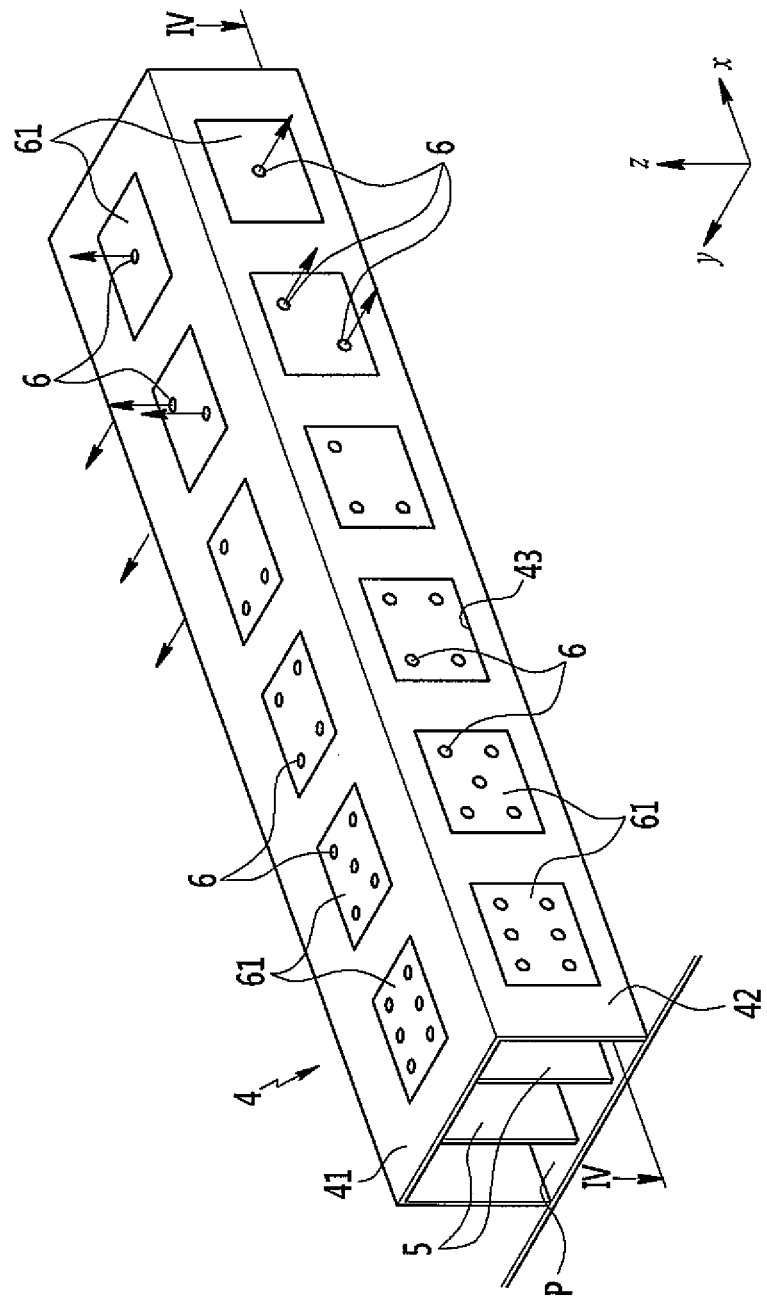
FIG. 3 is a perspective view of an access floor applicable to FIG. 1.

FIG. 3 is a perspective view of an access floor applicable to FIG. 1.

Referring to FIGS. 2 and 3, the access floor 4 includes an upper plate 41 and a pair of side plates 42 that are provided at opposite sides of the upper plate, thereby forming a duct for supplying the cooling air current.

In this case, the supply holes 6 may be formed in the upper plate 41 and the side plates 42 to supply the cooling air current in upward and lateral directions.

That is, the perforated plates 61 may be installed in the installation holes (or installation openings) 43 that are respectively provided in the upper plate 41 and the side plate 42.

Figure 4:
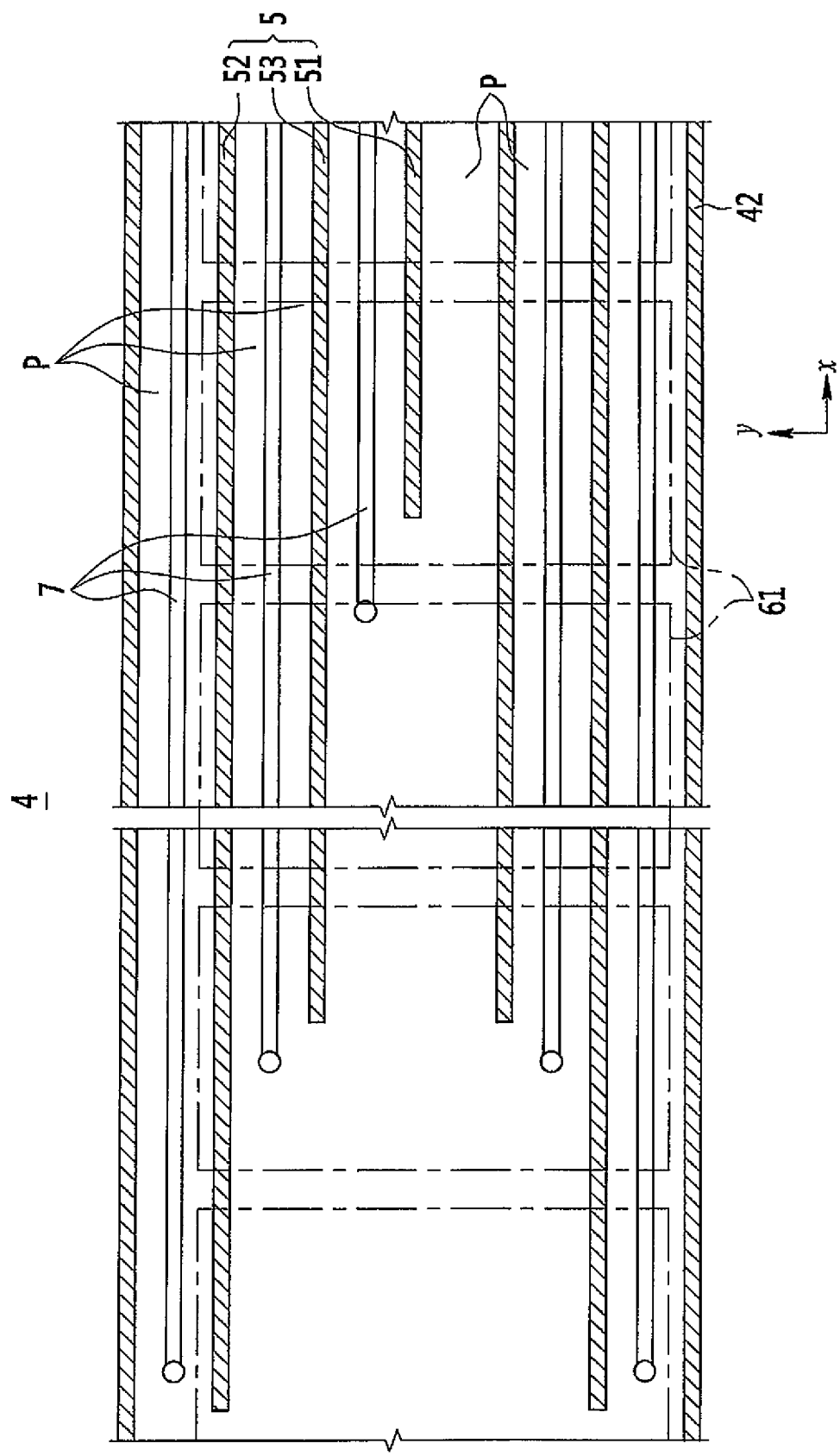
FIG. 4 is a cross-sectional view of FIG. 3 taken along the line IV-IV.

FIG. 4 is a cross-sectional view of FIG. 3 taken along the line IV-IV.

Referring to FIGS. 3 and 4, the distribution plate 5 is extended under the access floor 4 to be in parallel with a flow direction of the cooling air current (x-axis direction), and a plurality of distribution plates 5 are formed to be equally spaced from each other in a direction (y-axis direction) that is substantially perpendicular to the flow direction (x-axis direction).

That is, the distribution plates 5 form a plurality of air passageways P for distributing the cooling air current in the y-axis direction under the access floor 4.

As an example, the distribution plate 5 includes a first plate 51 that is disposed at a center part of the access floor 4 in a width direction thereof (y-axis direction), a second plate 52 that is disposed outward relative to the first plate 51, and at least one third plate 53 that is disposed between the first and second plates 51 and 52.

More specifically, the first plate 51 is disposed at the center part of the access floor 4 based on a width direction of the upper plate (y-axis direction), and the second plate 52 is disposed outward relative to the first plate 51.

That is, the second plate 52 is disposed adjacent to the side plates 42 that are disposed at opposite sides of the upper plate 41 based on the width direction thereof (y-axis direction).

A plurality of third plates 53 may be provided, but in the present exemplary embodiment, one third plate 53 is provided for convenience.

Lengths of the distribution plates 51, 52, and 53 gradually become longer the closer they are to the second plate 52 and the farther they are from the first plate 51. In other words, the length of the distribution plates increases as they approach the second plate 52 and decrease as they approach the first plate 51, and the distribution plates nearer to the second plate 52 are longer than those nearer to the first plate 51.

Though not illustrated, when the plurality of third plates are provided, the lengths of the third plates may become gradually longer coming closer to the outer side from the center.

Accordingly, the air passageways P divided by the first, second, and third plates 51, 52, and 53 become shorter coming closer to the center part of the upper plate 41 while becoming gradually longer closer to the outer part thereof. In other words, the length of the air passageways P increases as they approach the second plate 52 and decrease as they approach the first plate 51.

That is, the air passageways P are respectively divided at a supply side of the cooling air current, while becoming one air passageway at an opposite side thereof.

In this case, the air passageways P provided at the center part are integrated into one since they are more adjacent to the supply side of the cooling air current.

That is, the air passageways P are gradually integrated into one further away from the supply side of the cooling air current.

That is, the air passageways P supply the cooling air current closer to the supply side of the cooling air current using a relatively small area and a high wind speed, while supplying the cooling air current further away from the supply side of the cooling air current using a relatively wide area and a low wind speed.

Meanwhile, the energy storage device is provided with harnesses for connecting the battery packs 1, and the harness bundles 7 are installed in the air passageways P according to the lengths of the distribution plates 51, 52, and 53.

That is, one of the harness bundles 7 having a short length (or relatively short length) is arranged or installed in the air passageway P of the center part where a dividing distance is short such that it is coupled to the rack 2 corresponding to its length, while another harness bundle 7 having a long length (or relatively long length) is arranged or installed in the air passageway P of the outer part where the dividing distance is long such that it is coupled to the rack 2 corresponding to its length.

Referring back to FIGS. 1 and 2, the energy storage device includes an air blower 8 that is provided at one side of the access floor 4 to supply the cooling air current, and a ventilator 9 that is provided at an upper part of the container 3.

The air blower 8 supplies the low-temperature cooling air current through the supply holes 6 to inside of the container 3 from outside thereof, while the ventilator 9 discharges the warm air current, which is heated by cooling the battery packs 1 that are accommodated in the racks 2, to outside of the container 3 from inside thereof.

That is, the air blower 8 and the ventilator 9 are driven to supply the cooling air current to the battery packs 1 and discharge the heated warm air current to outside of the container 3, thereby obtaining uniform or substantially uniform distribution of cooling air current toward above the access floor 4 from therebelow.

Figure 5:
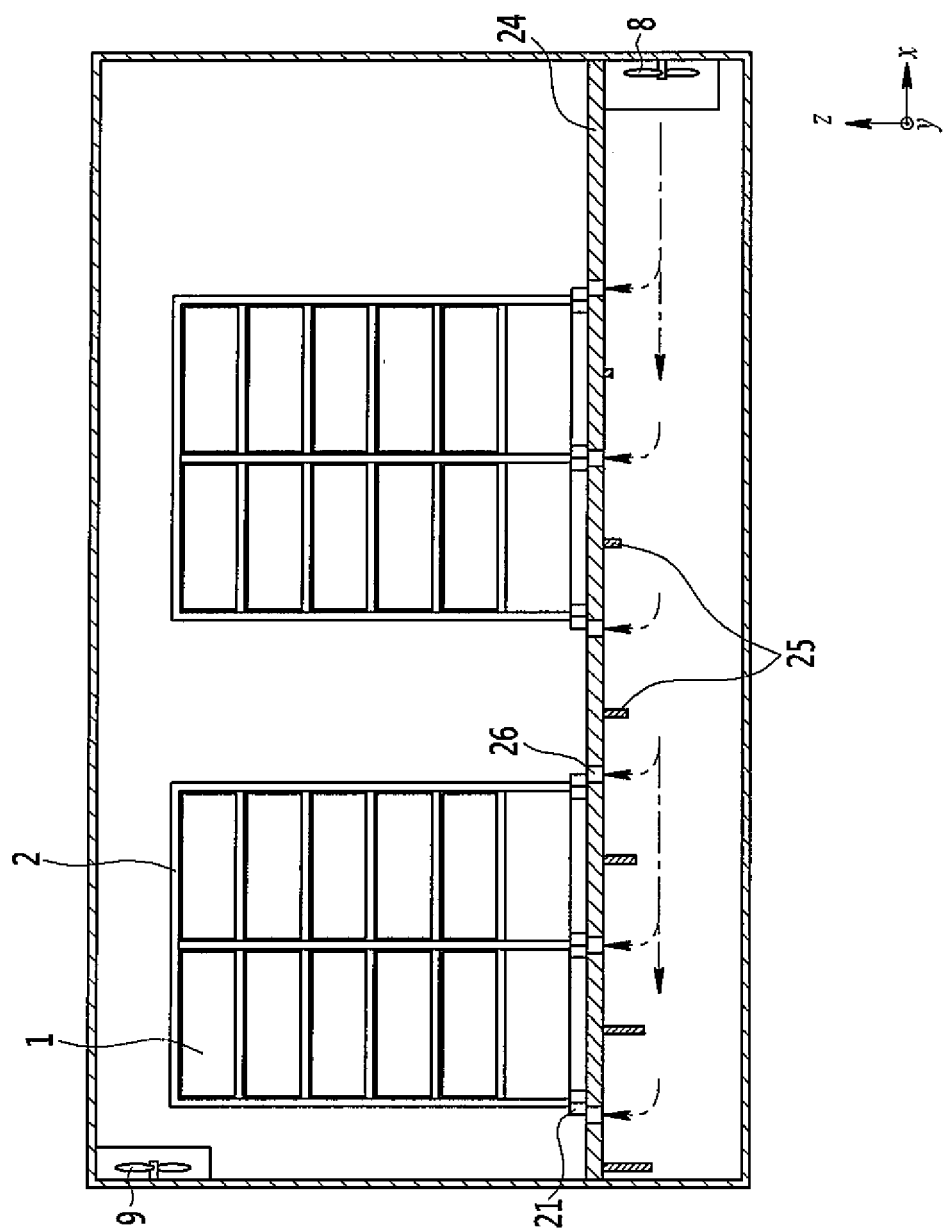
FIG. 5 is a cross-sectional view of an energy storage device according to a second exemplary embodiment of the present invention.

In addition, when viewed from lateral sides of the container 3, the air blower 8 and the ventilator 9 can be diagonally disposed to each other to generate the air current, thereby more uniformly distributing the cooling air current (refer to FIG. 5).

Meanwhile, the provided perforated plates 61 are fixed to the upper plate 41 and the side plate 42 of the access floor 4 to supply the cooling air current through the supply holes 6 (or supply openings) 6 in the upward and lateral directions of the access floors 4, such that the cooling air current passing through the racks 2 and the battery packs 1 of each rack 2 can be more uniformly distributed.

In addition, the supply holes (or supply openings) 6 have a smaller opening area (degree of opening) closer to the air blower 8, while having a larger opening area (degree of opening) further away from the air blower 8 (refer to FIG. 3).

The supply holes (or supply openings) 6 may be provided in the upper plate 41 and the side plates 42 to have the same opening area that increases at the same rate. For example, the number of supply openings in the perforated plates 61 may increase for both the upper plate 41 and the side plates 42 at the same rate.

Accordingly, the supply holes 6 closer to the air blower 8 supply the cooling air current using the relatively smaller opening area and the high wind speed, and the supply holes 6 further away from the air blower 8 provide the cooling air current using the relatively large opening area and the low wind speed.

That is, even if the supply holes 6 are differently distanced from the air blower 8, they may supply the air volume of the cooling air current to the plurality of racks 2 with minimum or reduced deviations (or variations) therebetween.

Accordingly, the temperature deviations (or variations) between the plurality of racks 2 may be minimized or reduced.

The temperature deviations (or variations) between the battery packs 1 of each rack 2 may also be reduced.

A second exemplary embodiment of the present invention will now be described.

Compared with the first exemplary embodiment, the same configurations will be omitted from further descriptions and different configurations will be described.

FIG. 5 is a cross-sectional view of an energy storage device according to the second exemplary embodiment of the present invention.

Referring to FIG. 5, distribution plates 25 are extended in a direction (y-axis direction) that crosses a flow direction of the cooling air current (x-axis direction), and a plurality of the distribution plates 25 are formed such that they are disposed to be spaced apart from each other along the flow direction (x-axis direction).

Since the plurality of distribution plates 25 are attached to a bottom surface of an access floor 24 to protrude downward, they are configured to control the air volume of the cooling air current supplied to supply holes 26 by partially blocking the cooling air current.

For example, the plurality of distribution plates 25 protrude least at a supply side of the cooling air current, while protruding longer further away from the supply side of the cooling air current.

Accordingly, since the distribution plate 25 closest to the air blower 8 minimally blocks (e.g., blocks by a relatively small amount) the cooling air current to pass most of it in the flow direction (x-axis direction), it provides the cooling air current to the supply holes 26 using a small amount of opening (e.g., a relatively small opening area) and a high wind speed in the vicinity of the air blower 8.

Since the distribution plate 25 blocks more of the cooling air current to pass less of it in the flow direction (x-axis direction) further away from the air blower 8, it provides the cooling air current to the supply holes 26 using a large opening area and a low wind speed further away from the air blower 8.

That is, even if the plurality of supply holes 26 are differently distanced from the air blower 8, they may provide the cooling air current to the racks 2 with air volumes of a minimum (or reduced) deviation through the distribution plates 25, thereby minimizing or reducing the temperature deviations (or variations) between the racks 2.

Figure 6:
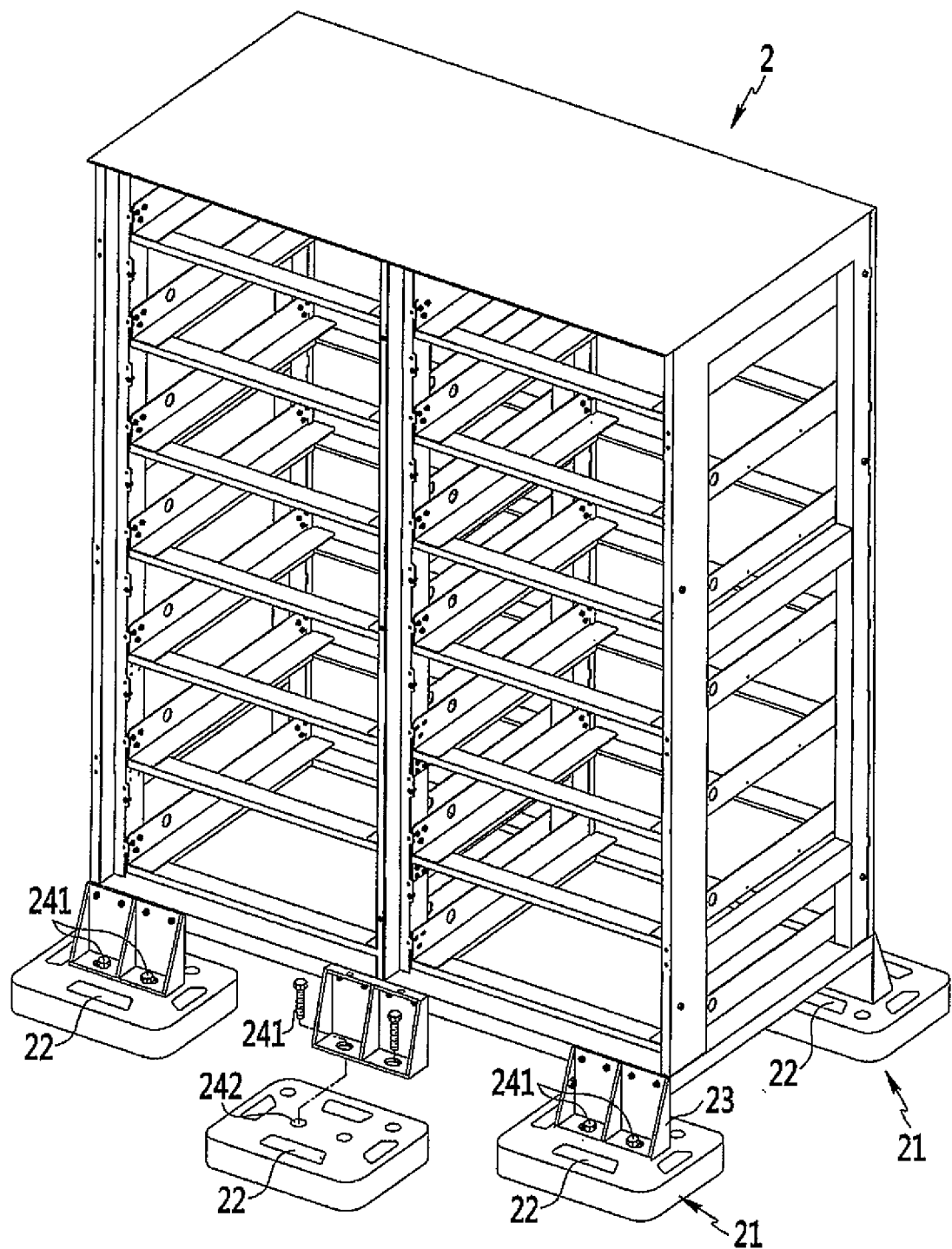
FIG. 6 is a perspective view of a rack and supporters of FIG. 5.

FIG. 6 is a perspective view of the rack and supporters of FIG. 5.

Referring to FIGS. 5 and 6, the rack 2 is installed on the access floor 24 while interposing supporters 21 therebetween.

The supporters 21 are provided with transmission passages 22 that are connected to some of the supply holes (or supply openings) 26 to supply the cooling air current to the battery packs 1.

For example, the supporter 21 includes a screw hole 242 that is fastened with (e.g., that engages with) a bolt 241 that penetrates an installation bracket 23 of the rack 2.

Thus, after the supporters 21 are installed to be at least partially connected to the supply holes (or supply openings) 26 and the installation brackets 23 are then installed in the supporters 21, the rack 2 is installed on the access floor 24 while interposing the supporters 21 therebetween by fastening the bolt 241 penetrating the installation bracket 23 to the screw hole 242.

In this case, the transmission passage 22 provided around the screw hole 242 connects the supply hole (or supply opening) 26 to an upper part of the supporter 21.

That is, the cooling air current supplied to the supply holes (or supply openings) 26 may be partially supplied to the lateral sides of the rack 2 and to inside and outside of the rack 2 through the transmission passages 22.

Though not illustrated, the rack may be formed with additional cooling air current passageways in a frame for accommodating the battery packs.

Thus, the cooling air current is supplied to a plurality of stories (e.g., a plurality of levels or floors) through the air passageways formed in the frame such that it is supplied to the battery packs accommodated in the plurality of stories.

That is, the temperature deviations (or variations) of the battery packs can be further minimized inside each rack.

Figure 7:
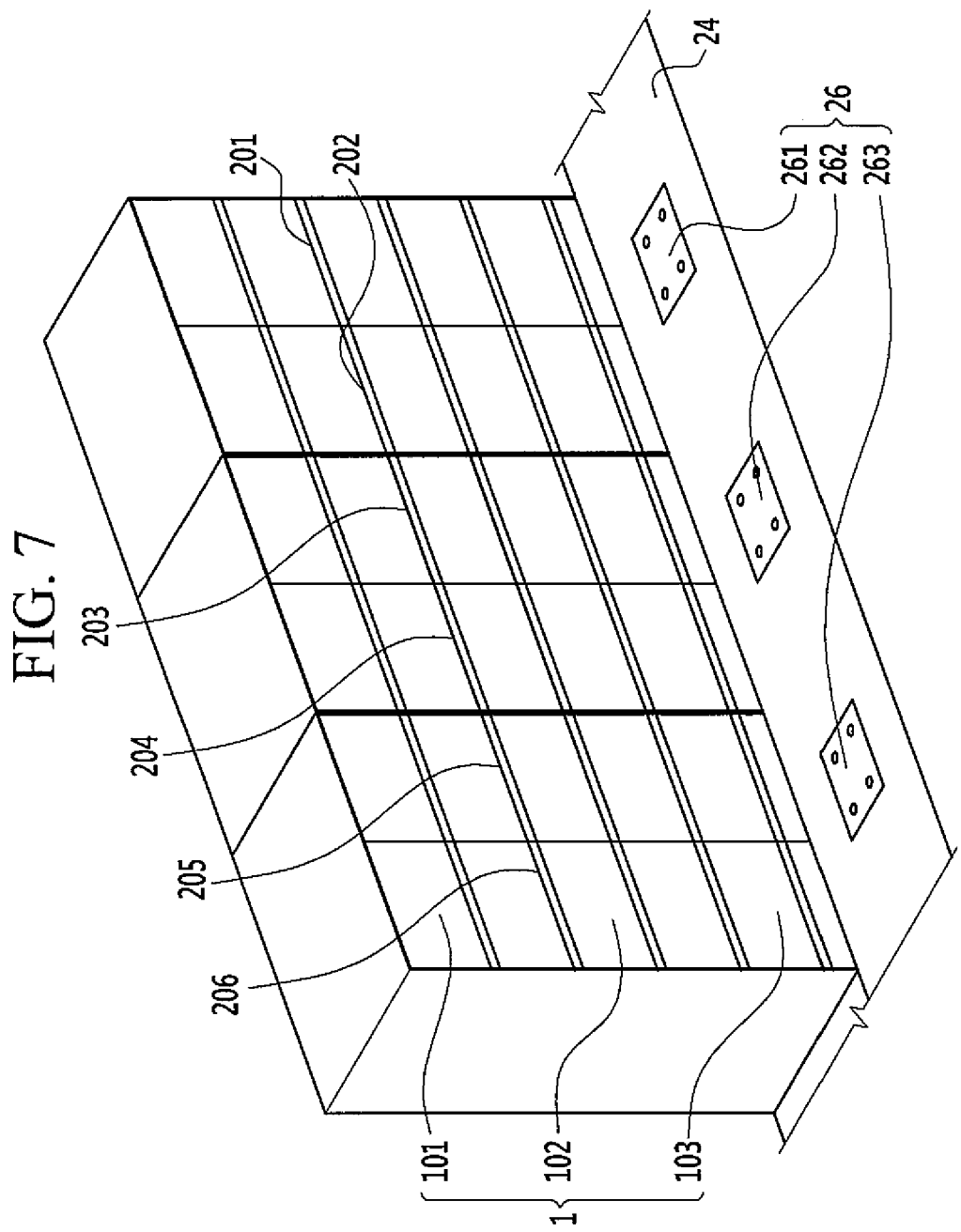
FIG. 7 is an internal perspective view of the energy storage device of the second exemplary embodiment.

FIG. 7 is an internal perspective view of the energy storage device of the second exemplary embodiment.

Referring to FIG. 7, a preset condition of the energy storage device is as follows.

A wind speed of the cooling air current supplied from the air blower 8 exceeds 1.5 m/s, a temperature is set to 23.5° C., one hour has passed since it is driven, and the temperature deviations (or variations) are less than 1° C.

Among the supply holes (or supply openings) 26, a first supply hole (or supply opening) 261, a second supply hole (or supply opening) 262, and a third supply hole (or supply opening) 263, which are gradually distanced further away from the vicinity of the air blower 8, are respectively opened in the amounts of 30%, 60%, and 100% as the distribution plates 25 protrude further and the number of holes increases, such that they respectively supply the cooling air current with wind speeds of 2.3 m/s, 2.1 m/s, and 1.6 m/s.

Among the racks 2, the first, second, third, fourth, fifth, and sixth racks 201, 202, 203, 204, 205, and 206, which are gradually distanced further away from the vicinity of the air blower 8, respectively accommodate upper, middle, and lower battery modules 101, 102, and 103, and in this case, the temperature distribution between the racks 2 and the battery modules 101, 102, and 103 is shown in Table 1 below.

TABLE 1

| Battery module | 1st rack | 2nd rack | 3rd rack | 4th rack | 5th rack | 6th rack |
| --- | --- | --- | --- | --- | --- | --- |
| Upper 101 | 18° C. | 18° C. | 18° C. | 18° C. | 18° C. | 18° C. |
| Middle 102 | 18° C. | 18° C. | 18° C. | 17° C. | 18° C. | 18° C. |
| Lower 103 | 18° C. | 18° C. | 18° C. | 18° C. | 18° C. | 18° C. |

As a result, since internal temperature of the container 3 is uniformly or substantially uniformly controlled, the maximum temperature deviation between the first, second, third, fourth, fifth, and sixth racks 201, 202, 203, 204, 205, and 206 and between the upper, middle, and lower battery modules 101, 102, and 103 can be maintained within 1° C.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and their equivalents.

| Description of Some of the Symbols | |
| --- | --- |
| 1: battery pack | 2: rack |
| 3: container | 4, 24: access floor |
| 5, 25: distribution plate | 6, 26: supply hole (or supply opening) |
| 7: harness bundle | 8: air blower |

-continued

Description of Some of the Symbols

| | |
|---|---|
| 9: ventilator | 21: supporter |
| 22: transmission passage | 23: installation bracket |
| 41: upper plate | 42: side plate |
| 43: installation hole | 51, 52, 53: first, second, third plate |
| 61: perforated plate | |
| 101, 102, 103: upper, middle, and lower battery module | |
| 241: bolt | 242: screw hole |
| 201, 202, 203, 204, 205, 206: first, second, third, fourth, fifth, sixth rack | |
| P: air passageway | |

What is claimed is:

1. An energy storage device comprising:
racks for accommodating a plurality of battery packs;
a container for accommodating the racks;
an access floor at a lower part of the container for supplying a cooling air current to the racks through supply openings, the access floor comprising an upper plate and a pair of side plates extending down from opposite lateral sides of the upper plate; and
at least one distribution plate under the access floor to distribute an amount of the cooling air current that is supplied from under the access floor,
wherein the supply openings are provided in the upper plate and the pair of side plates, and
wherein a number of the supply openings increases in a direction extending away from a supply side of the access floor.

2. The energy storage device of claim 1, wherein the supply openings are perforations in perforated plates, and the perforated plates are installed in the upper plate and the pair of side plates of the access floor.

3. The energy storage device of claim 1, wherein the at least one distribution plate comprises a plurality of distribution plates configured to create a plurality of air passageways for distributing the cooling air current and wherein the distribution plates are extended in parallel with a flow direction of the cooling air current and spaced apart from each other in a direction crossing the flow direction.

4. The energy storage device of claim 3, wherein the distribution plates comprise: a first plate at a center part in a width direction of the access floor; a second plate located outwardly relative to the first plate; and one or more third plates between the first and second plates, wherein the one or more third plates nearer to the second plate are longer than those nearer to the first plate.

5. The energy storage device of claim 3, wherein the distribution plates comprise: a first plate at a center part in a width direction of the upper plate; a second plate located outwardly relative to the first plate; and one or more third plates between the first and second plates, wherein the one or more third plates nearer to the second plate are longer than those nearer to the first plate.

6. The energy storage device of claim 5, wherein harness bundles connected to the battery packs are separately arranged in the air passageways according to the lengths of the distribution plates.

7. The energy storage device of claim 4, further comprising: an air blower at the supply side of the access floor to supply the cooling air current through the supply openings; and a ventilator at an upper part of the container to discharge a warm air current that is heated by cooling the battery packs accommodated in the racks.

8. The energy storage device of claim 7, wherein the supply openings have a smaller opening area closer to the air blower, and have a larger opening area further away from the air blower.

9. The energy storage device of claim 1, wherein a plurality of distribution plates comprising the distribution plate extend in a direction crossing a flow direction of the cooling air current, are spaced apart from each other along the flow direction, and are attached to a bottom surface of the access floor to control the cooling air current that is supplied to the supply openings.

10. The energy storage device of claim 9, wherein the distribution plates protrude least at the supply side of the access floor, and protrude longer further away from the supply side of the access floor.

11. The energy storage device of claim 9, wherein:
the racks are installed on the access floor, a plurality of supporters are interposed between the racks and the access floor, and
the supporters have transmission passages that are connected to some of the supply openings to supply the cooling air current to the battery packs.

* * * * *